(12) United States Patent
Yang et al.

(10) Patent No.: US 8,706,727 B2
(45) Date of Patent: Apr. 22, 2014

(54) DATA COMPRESSION FOR REDUCING STORAGE REQUIREMENTS IN A DATABASE SYSTEM

(75) Inventors: Xinjun Yang, Dublin, CA (US); Xudong Qian, Shanghai (CN)

(73) Assignee: Sybase, Inc., Dublin, CA (US)

( * ) Notice: Subject to any disclaimer, the term of this patent is extended or adjusted under 35 U.S.C. 154(b) by 321 days.

(21) Appl. No.: 12/488,022

(22) Filed: Jun. 19, 2009

(65) Prior Publication Data

US 2010/0325094 A1 Dec. 23, 2010

(51) Int. Cl.
*G06F 17/30* (2006.01)

(52) U.S. Cl.
USPC .......................................................... 707/736

(58) Field of Classification Search
USPC ............................ 707/693, 796, 999.101, 736
See application file for complete search history.

(56) References Cited

U.S. PATENT DOCUMENTS

| | | | |
|---|---|---|---|
| 5,467,087 A * | 11/1995 | Chu ................................ 341/51 |
| 5,678,043 A * | 10/1997 | Ng et al. ........................ 707/693 |
| 6,567,546 B1 * | 5/2003 | Eguchi et al. .................. 382/181 |
| 6,661,845 B1 | 12/2003 | Herath |
| 6,721,753 B1 * | 4/2004 | Kataoka et al. .......... 707/999.01 |
| 7,009,722 B1 | 3/2006 | Nishigaki |
| 7,260,275 B2 | 8/2007 | Shiraishi et al. |
| 8,126,900 B1 * | 2/2012 | Kostamaa et al. ............. 707/756 |
| 2002/0138509 A1 * | 9/2002 | Burrows et al. ............... 715/205 |
| 2005/0240398 A1 * | 10/2005 | Chen et al. .................... 704/222 |
| 2008/0133562 A1 * | 6/2008 | Cheong et al. ........... 707/999.101 |
| 2008/0288678 A1 * | 11/2008 | Nakagawa et al. .............. 710/68 |
| 2009/0187673 A1 * | 7/2009 | Ramjee et al. ................. 709/247 |
| 2009/0193006 A1 * | 7/2009 | Herrnstadt ............. 707/999.005 |
| 2009/0217181 A1 * | 8/2009 | Kumar .......................... 715/762 |

OTHER PUBLICATIONS

International Search Report and Written Opinion, dated Jan. 27, 2011, for PCT Appl. No. PCT/US2010/038994, 9 pages.

* cited by examiner

*Primary Examiner* — Etienne Leroux
(74) *Attorney, Agent, or Firm* — Sterne, Kessler, Goldstein & Fox P.L.L.C.

(57) ABSTRACT

A system, method, and computer program product for reducing data storage requirements in a database system are described herein. An embodiment includes identifying at least one data candidate of fixed length data type in at least one row of database data for compression based upon a predetermined threshold level and a boundary of compression, providing at least one bit within the at least one row for an identified data candidate according to the boundary of compression, and storing the at least one row as compressed data in the database system. For compression based on a row boundary, the identified data candidates for compression include fixed length columns having lengths that do not fall below the predetermined threshold level in a row of data and the at least one bit comprises a bitmap for a length of the identified data candidates following compression. For compression based on a page boundary, the identified data candidates for compression include redundant byte string data in a page of data, the redundant byte string data including matching data across columns having lengths that do not exceed the predetermined threshold level.

32 Claims, 7 Drawing Sheets

| row header | col1 | col2 | col3 | col4 | row length | col5 | offset table for col5 |
|---|---|---|---|---|---|---|---|
| 6 bytes | 1 byte | 50 bytes | 1 byte | 4 bytes | 2 bytes | | 2 bytes |

FIG. 4  400

| row header | row length | col1 | col3 | col2 | col4 | col5 | padding | col5's length | col4's length | col2's length |
|---|---|---|---|---|---|---|---|---|---|---|
| 6 bytes | 2 byte | 1 byte | 1 byte | | | | 3 bits | 5 bits | 2 bits | 6 bits |

FIG. 5  500

| row header | 'a' | "aaaaa" | 1 | 100 | row length | "bbbbb" | offset table for col5 |
|---|---|---|---|---|---|---|---|
| 6 bytes | 1 byte | 50 bytes | 1 byte | 4 bytes | 2 bytes | 5 bytes | 2 bytes |

FIG. 6  600

| row header | row length | 'a' | 1 | "aaaaa" | 100 | "bbbbb" | 000 | 00101 | 00 | 000100 |
|---|---|---|---|---|---|---|---|---|---|---|
| 6 bytes | 2 byte | 1 byte | 1 byte | 5 bytes | 1 byte | 5 bytes | 3 bits | 5 bits | 2 bits | 6 bits |

| row header | row length | page dictionary chart | col1 | the index of page dictionary of col2 | col2 | col3 | col4 | col5 | offset table for col5 |
|---|---|---|---|---|---|---|---|---|---|
| 6 bytes | 2 bytes | 1 byte | 1 byte | 1 byte | | | | 1 byte | 4 bytes | 2 bytes |

| ol_o_oid | ol_d_id | ol_w_id | ol_number | ol_i_id | ol_supply_w_id | ol_delivery_d | ol_quantity | ol_amount | ol_dist_info |
|---|---|---|---|---|---|---|---|---|---|
| 682 | 1 | 7 | 11 | 30000 | 7 | Dec 1 2008 4:05PM | 5 | 0.000000 | 9VxkRqF143mVHwSaeSVYN3Oq |
| 682 | 1 | 7 | 12 | 93193 | 7 | Dec 1 2008 4:05PM | 5 | 0.000000 | MztKSoTbHLcrdICX7Hxuo7dB |
| 682 | 1 | 7 | 13 | 50383 | 7 | Dec 1 2008 4:05PM | 5 | 0.000000 | tjVOdv6YpBbZoc9MPDz4sowU |
| 682 | 1 | 7 | 14 | 70901 | 7 | Dec 1 2008 4:05PM | 5 | 0.000000 | rbINenw7E6WGuDjy6tobkWVT |
| 683 | 1 | 7 | 1 | 3459 | 7 | Dec 1 2008 4:05PM | 5 | 0.000000 | LyKigaQDThbdTya8EDdzpRSf |
| 683 | 1 | 7 | 2 | 1232 | 7 | Dec 1 2008 4:05PM | 5 | 0.000000 | Y3EDkaNY3RQfkqcQ6DUmKlHl |
| 683 | 1 | 7 | 3 | 55341 | 7 | Dec 1 2008 4:05PM | 5 | 0.000000 | AYh11WBabQM5w4Sj6Xh1FCYq |
| 683 | 1 | 7 | 4 | 98313 | 7 | Dec 1 2008 4:05PM | 5 | 0.000000 | SjC8RaCoa5fN6WqtO3IMQu5b |
| 683 | 1 | 7 | 5 | 1347 | 7 | Dec 1 2008 4:05PM | 5 | 0.000000 | 89WgdWaQcFGzsS4IzsVYUuyf |
| 683 | 1 | 7 | 6 | 51276 | 7 | Dec 1 2008 4:05PM | 5 | 0.000000 | T5mC26cSUwu6ICGcpHkIEmnE |
| 684 | 1 | 7 | 1 | 18089 | 7 | Dec 1 2008 4:05PM | 5 | 0.000000 | FV0ojIthLdloX1lcWVvCTJZB |
| 684 | 1 | 7 | 2 | 38396 | 7 | Dec 1 2008 4:05PM | 5 | 0.000000 | NKHS3mkzOjnFXu7p0fWuZH2Q |
| 684 | 1 | 7 | 3 | 51067 | 7 | Dec 1 2008 4:05PM | 5 | 0.000000 | |

Page Header (44 bytes)

Page Dictionary

Page Index

NCFS (noncontiguous free space)
(interlaced with data/index rows)

CFS (contiguous free space)

| row header | ol_o_id | ol_number | ol_i_id | ol_delivery_d | ol_amount | ol_dist_info |
|---|---|---|---|---|---|---|
| 6 bytes | 4 bytes | 1 byte | 4 bytes | 8 bytes | 4 bytes | 24 bytes |

FIG. 13   1300

| row header | row length | page dictionary chart | fixed length column without compression | fixed length column with compression | variable column | compressed offset table |
|---|---|---|---|---|---|---|

FIG. 14   1400

DATA COMPRESSION FOR REDUCING STORAGE REQUIREMENTS IN A DATABASE SYSTEM

FIELD OF THE INVENTION

The present invention relates generally to database systems and, more particularly, to data compression in database systems.

BACKGROUND OF THE INVENTION

Computers are very powerful tools for storing and providing access to vast amounts of information. Relational databases are a common mechanism for storing information on computer systems while providing easy access to users. A typical relational database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a relational database management system or RDBMS is typically provided as a software cushion or layer. In essence, the RDBMS shields the database user from knowing or even caring about the underlying hardware-level details. Typically, all requests from users for access to the data are processed by the RDBMS. For example, information may be added or removed from data files, information retrieved from or updated in such files, and so forth, all without user knowledge of the underlying system implementation. In this manner, the RDBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Efficient data access is one of the properties provided by a database management system. A key challenge faced by relational database systems is the ever-growing database size. With increasing use of digital devices and ease of data flow on ubiquitous networks, the data explosion has accelerated in recent years. As regular database and table size has grown tremendously in recent years, data compression becomes increasing important even for databases. While row level compression and page level compression for databases have been introduced, a need remains for improved compression techniques to overcome deficiencies in these approaches without introducing new overhead. The present invention addresses this need.

SUMMARY OF THE INVENTION

The invention includes methods, systems, and computer program products for reducing data storage requirements in a database system. An embodiment includes identifying at least one data candidate of fixed length data type in at least one row of database data for compression based upon a predetermined threshold level and a boundary of compression, providing at least one bit within the at least one row for an identified data candidate according to the boundary of compression, and storing the at least one row as compressed data in the database system. For compression based on a row boundary, the identified data candidates for compression include fixed length columns having lengths that do not fall below the predetermined threshold level in a row of data and the at least one bit comprises a bitmap for a length of the identified data candidates following compression. For compression based on a page boundary, the identified data candidates for compression include redundant byte string data in a page of data, the redundant byte string data including matching data across columns having lengths that do not exceed the predetermined threshold level.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Linux, Solaris, UNIX, IBM AIX, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method act and an apparatus element for performing the method act. Depending upon the implementation, the corresponding apparatus element may be configured in hardware, software, firmware, or combinations thereof.

Figure 1:
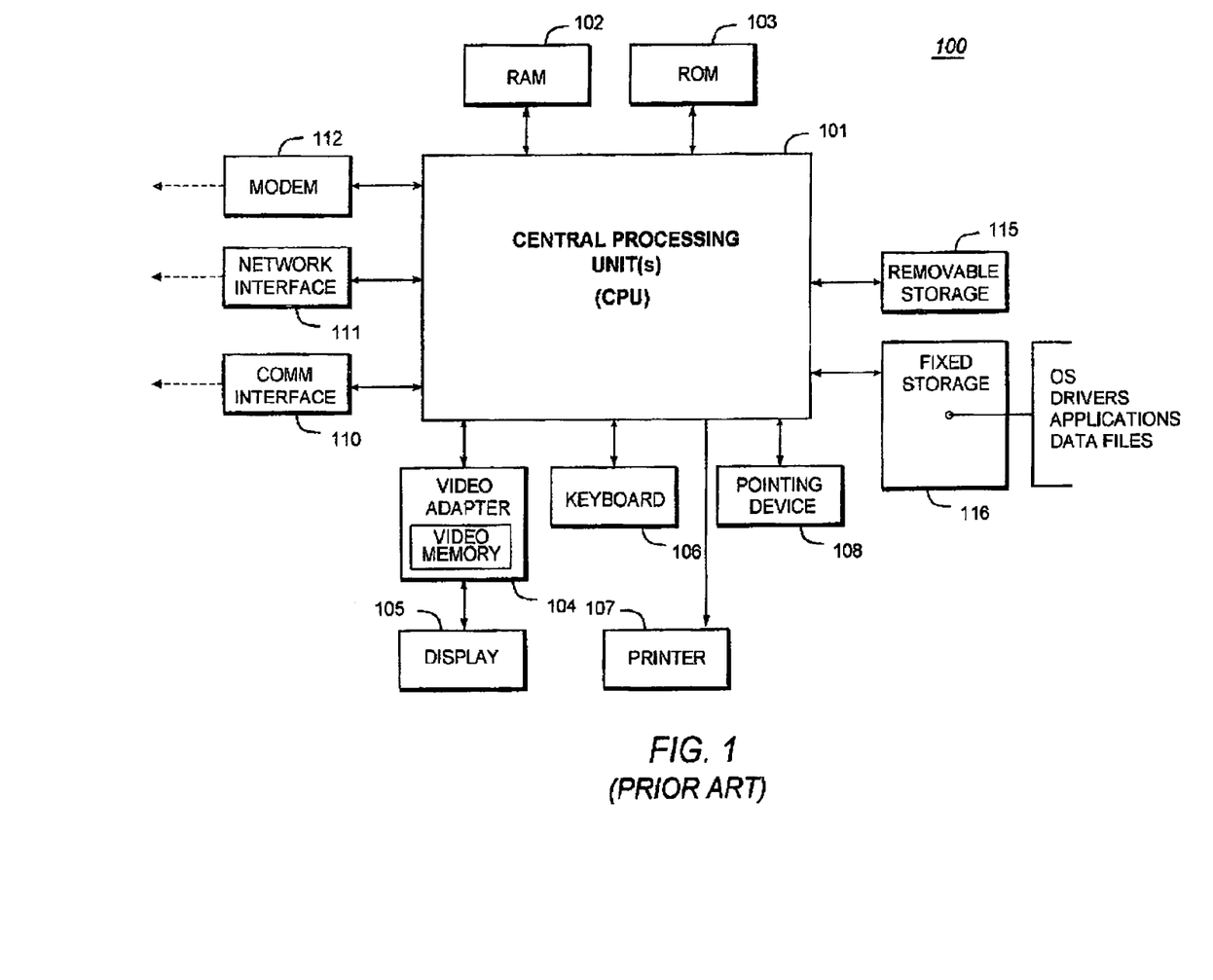
FIG. 1 illustrates a general block diagram of a computer system in which software-implemented processes of the present invention may be embodied

The present invention may be implemented on a conventional or general-purpose computer system, such as an IBM-compatible personal computer (PC) or server computer. FIG. 1 illustrates a general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises any suitable processor, such as a processor of the Intel Pentium family of microprocessors, for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components, as is well understood in the art. Random-access memory 102 serves as the working memory for the CPU 101. In a typical configuration, RAM of multiple megabytes or gigabytes is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display device 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like.

Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Figure 2:
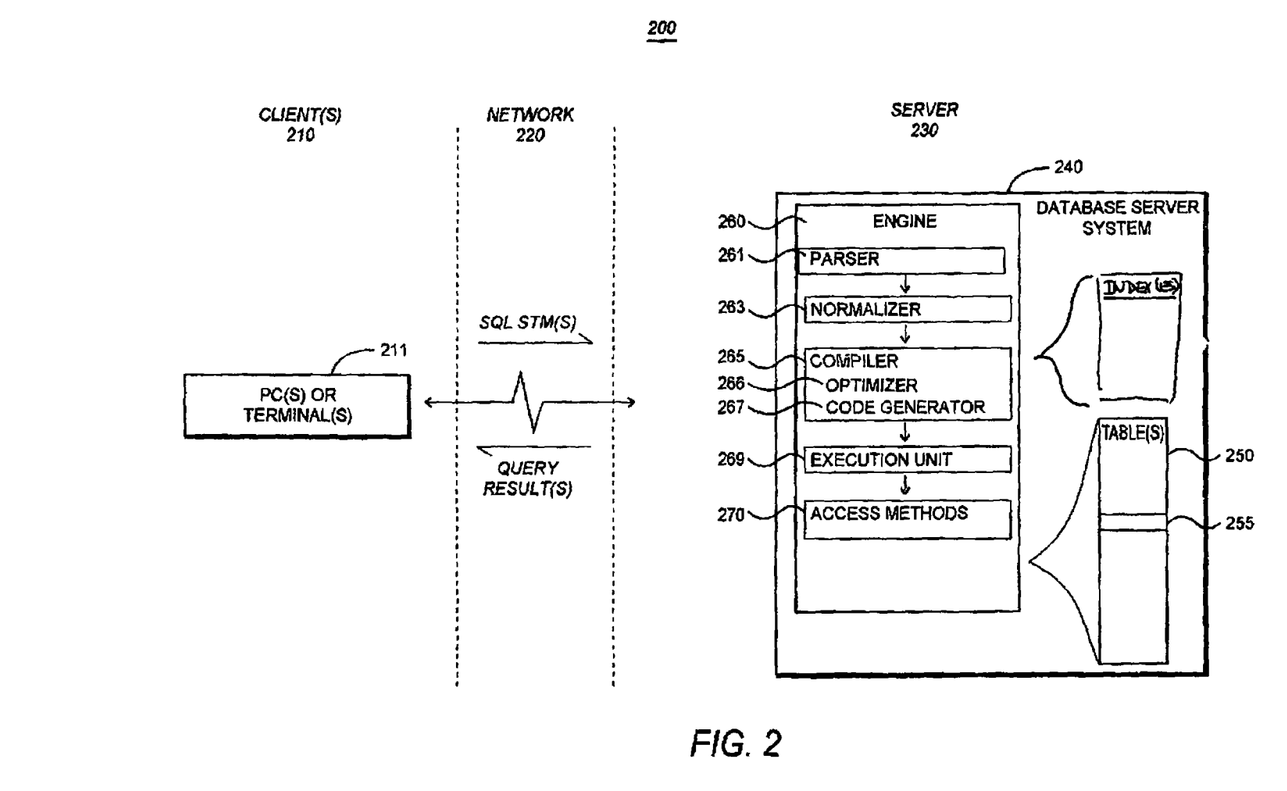
FIG. 2 illustrates the general structure of a client/server database system 200 suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (ASE) (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240. The described computer hardware and software are presented for purposes of illustrating the basic underlying desktop and server computer components that may be employed for implementing the present invention. For purposes of discussion, the following description will present examples in which it will be assumed that there exist multiple server instances (e.g., database server nodes) in a cluster that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Client/server environments, database servers, and networks are well documented in the technical, trade, and patent literature. In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access method 270. Specifically, the SQL statements are passed to the parser 261 which employs conventional parsing methodology (e.g., recursive descent parsing). The parsed query is then normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query is passed to the compiler 265, which includes a query optimizer 266 and a code generator 267. The query optimizer 266 performs a cost-based analysis for formulating a query execution plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

Figure 3:
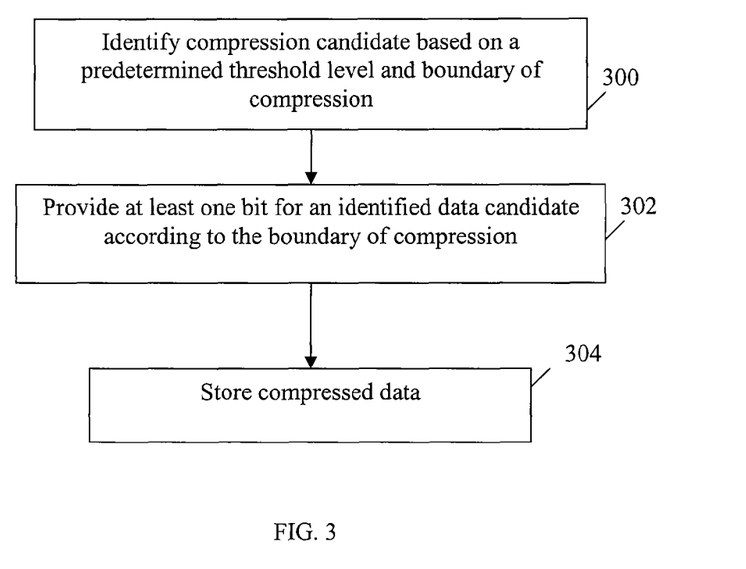
FIG. 3 illustrates an overall flow diagram for reducing data storage requirements in a database system in accordance with an embodiment of the present invention.

The present invention improves I/O performance for more efficient query processing and database operation by utilizing compression techniques that reduce data storage requirements. As will be described in further detail herein below, embodiments of the present invention address both row level boundary compression and page level boundary compression. FIG. 3 illustrates an overall flow diagram for reducing data storage requirements in a database system by these compression techniques. The process includes identifying at least one data candidate of fixed length data type in at least one row of database data for compression based upon a predetermined threshold level and a boundary of compression (block 300).

At least one bit is provided within the at least one row for an identified data candidate according to the boundary of compression (block 302). The at least one row is then stored as compressed data in the database system (block 304).

In performing data compression at a row boundary, row level compression is performed by recognizing the possible waste of storage for fixed length data types. For example, ASE has a full set of fixed length data types, such as "int", "char", "double" etc., that can be used to define data columns. In most cases, the data actually stored in a fixed length data column does not need the fall length as defined. By way of example, in ASE, 4 bytes are used as a default size for the data type "int". If the data to be stored is "100", not all 4 bytes are needed, since 1 byte covers up to 28 (256), making the other 3 bytes redundant. Instead of wasting the space resulting from such a redundancy scenario, the row compression of the present invention includes storing the value of certain fixed length data types as needed and in variable length format. Some fixed length data types are not included in the row compression, since there would not be any benefit from the compression. For example, the data type "tinyint" uses only 1 byte. So, columns having such data types are not changed to variable length and remain as fixed length column format. In this way, those fixed data type column lengths that do not fall below a predetermined threshold level (e.g., 4 bytes) are considered for row compression.

In compressing row data by changing certain fixed length data types to variable length, offset data is used to indicate the variable length column. Prior approaches allow a fixed number of bytes, such as 2 bytes, for the column offset. In accordance with the present invention, further space savings is achieved by compressing the offset data in conjunction with changing more fixed length column to variable length. Instead of using a fixed number of bytes for each column offset, a bitmap is used to map out all the lengths for the variable length columns in a row. By using an offset bitmap, several bits indicate the length of the column after compression, where the number of bits used depends upon the maximum length of the column.

By way of example, suppose a table is created as indicated below:

```
create table t1 (col1 char(1),
                col2 char(50),
                col3 tinyint,
                col4 int,
                col5 varchar(20)) lock datapages
```

Figure 4:
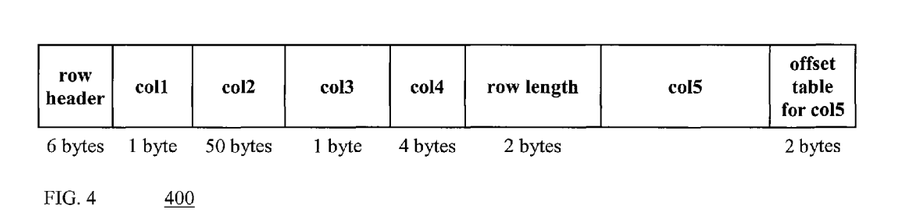
FIG. 4 depicts a row format before compression for an example table.

FIG. 4 illustrates the row format 400 before compression for this table. As can be recognized, the row format generally has a row header, followed by fixed length columns, followed by a row length, followed by variable length columns, and ending with an offset table. In order to reduce the storage requirements for the row, row based compression of a table can be used and normally occurs as a result of explicit specification in the create table statement. To compress the row in accordance with an embodiment of the invention, it is seen that column 1 is specified as one byte of "char" data type and column 3 is specified as "tinyint" data type (also one byte by default), so these columns do not meet the predefined threshold and therefore are not considered candidates for row level compression. Columns 2 and 4 are recognized to be potentially compressible, since they are of fixed data type with 50 bytes specified (column 2) and a default 4 bytes specified (column 4). Accordingly, column 2 and column 4 are changed to variable length columns as part of the row boundary compression.

Figure 5:
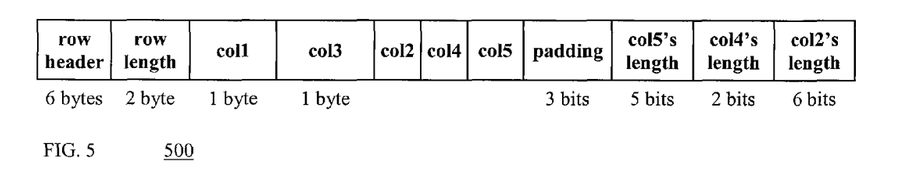
FIG. 5 depicts an altered row format for the example table when compressed in accordance with an embodiment of the present invention

As illustrated in FIG. 5, an altered row format 500 for the example table when compressed in accordance with an embodiment of the present invention includes positioning the row length after the row header and ahead of the fixed length columns that are not compressed. The compressed columns follow the uncompressed fixed columns, which are followed by the variable length columns that may also be compressed. The end columns of the row format provide the "offset bitmap" which indicates the length of each of the compressed columns and variable length columns. For example, the maximum length of the column 2 is 50, so 6 bits are used in the offset bitmap to indicate the column length ($2^6 \geq 50$). For column 4, 2 bits are used to indicate its length ($2^2 \geq 4$). 5 bits are used to indicate the length of column 5 ($2^5 \geq (20+1)$) by similar reasoning (the addition of 1 to the row length of the column will be explained below). Padding is included as needed in the offset bitmap to make the row align with a byte boundary. In this example, the bit padding comprises 3 bits.

Figure 6:
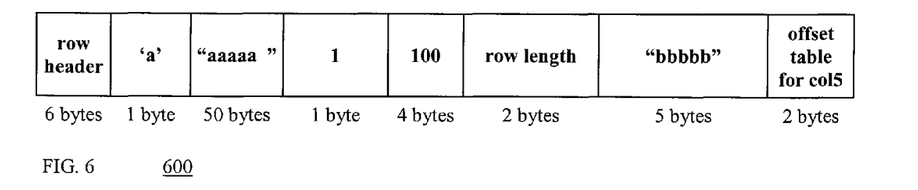
FIG. 6 depicts an input row of sample data with the uncompressed row format for the example of FIG. 4.
Figure 7:
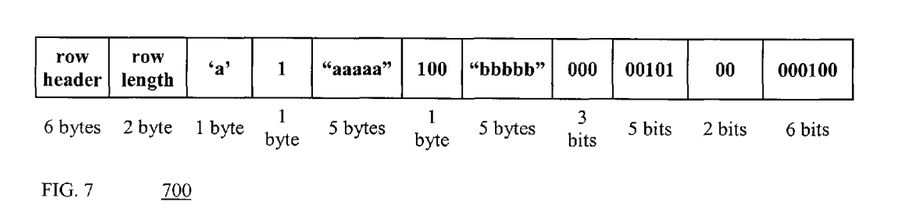
FIG. 7 depicts a row resulting after utilizing an embodiment of the compression approach of the present invention on the same input data used for FIG. 6.

In FIG. 6, an input row 600 of sample data is illustrated with the uncompressed row format for the example of FIG. 4. As shown, with the sample data, the total length is 71 bytes. FIG. 7 illustrates the row 700 after utilizing the compression approach of the present invention on the same input data. As shown, the total length of the compressed row is 23 bytes.

The reduced storage needed results from row level compressing. Referring to column 2, based on the example input data, the value is 5 'a' followed by 45 blanks. After compression, the compressed value of column 2 is the 5 'a' data and the length of the compressed column 2 is 5. For column 4 (int), the value is 100, so only one byte is needed to represent this value. Based on the data for column 5 (varchar(20)), only five bytes are needed to store the value of column 5 and the trailing blanks are truncated.

In providing an offset bitmap to represent the compressed lengths, preferably the lack of a NULL value in the fixed length columns is recognized such that a '0' value can be used for a column with a length of 1, a '1' value can be used to represent a column with length 2, and so on. Accordingly, for the length of 5 for the compressed column 2 in the example, the bit string of 000100($0 \times 2^5 + 0 \times 2^4 + 0 \times 2^3 + 1 \times 2^2 + 0 \times 2^1 + 0 \times 2^0 = 0$) capably represents the length of 5. For column 4, the bit string 00($0 \times 2^1 + 0 \times 2^0 = 0$) capably represents the length of 1.

For column 5, since it is a variable data type, it could have a NULL value and thus the '0' value in the bit string cannot be used in the same manner as for the fixed data type columns being compressed. Accordingly, for the compressed column 5, the bit string 00101($0 \times 2^4 + 0 \times 2^3 + 1 \times 2^2 + 0 \times 2^1 + 1 \times 2^0 = 5$) is used to represent its length and the bit string 00000 would be used to represent a NULL value.

As has been described, some fixed length columns are not compressed since they do not have any redundancy (tinyint or bit, for example), while other fixed length columns (int or char for example) can be compressed to reduce redundancy. A number of bits are used in a compressed offset table to indicate the column's length following its compression. Further, variable length columns can be compressed in a similar manner. In addition, the offset table utilized provides storage savings since instead of using a set 2 bytes to indicate the offset of the variable length column, several bits in an offset bitmap indicate the column lengths after compression Further, when access to a compressed row is sought, such as through index or table scan, the row will be decompressed and the decompressed row will be transferred to other modules that need this row in the database system. In so doing, the row stays in uncompressed state in the memory unless it is needed. Significant disk IO savings are realized, since there are more rows in one page. Log space savings are realized also, since only the compressed information needs to be stored in the log, as is well appreciated by those skilled in the art.

In accordance with an embodiment of the present invention, data compression techniques address potential data redundancy on a page boundary with minimization of the data redundancy in columns in one or more rows on a given page. Under page compression, common 'byte' patterns at the beginning of all columns on the page are sought, where 'byte' patterns do not distinguish according to the column data type but instead all columns are treated as a byte string. Based on data redundancy found, a page dictionary is created and included in the page right after the existing page header, as shown in the page representation 800 of FIG. 8. Commonly, a page dictionary is created by extracting single column duplicates as dictionary entries and utilizing a symbol reference to the dictionary entry in the column data. In this manner, the single column extraction process looks for the common values in all the columns on that page.

Figure 8:
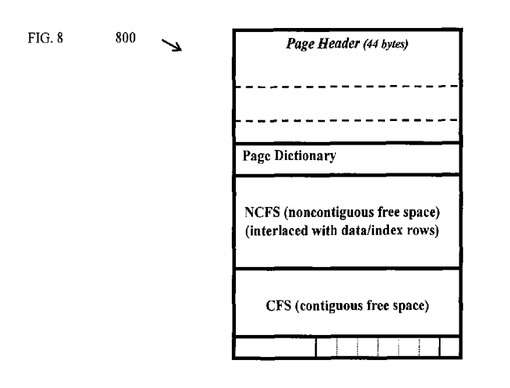
FIG. 8 depicts a page representation that includes a page dictionary in accordance with an embodiment of the present invention.

The process begins by extracting all the columns that exceed a predetermined length, such as 4 bytes, and are used as a page dictionary entry. Preferably, two arrays are used to indicate all of the extracted columns, e.g., BYTE*colptr[ ] (column pointer) and unit 16 collen[ ] (column length). A sorting of the extracted columns follows, such as using a quick sort, where the pointers, rather than the original columns, are exchanged for better performance. Through the sorting, the columns indicated by the array colptr[ ] are sorted on byte order, i.e., col1(aaa) appears ahead of col2(aab).

Next, an array offset[ ] is utilized to sort the column indicated by the colptr[ ] to indicate the length of the common prefix byte string. For example, starting from the first column indicated by the colptr[0], suppose colptr[0](aaaaa), colptr[1](aaaaa), colptr[2](aaaac), colptr[3](aaaad), colptr[4](abc) . . . . Accordingly, based on the common prefix byte string data, the resulting offset[ ] values are offset[0]=5, offset[1]=5, offset[2]=4, offset[3]=4, offset[4]=1. The values in this array are descending and generation of the array is ended if offset[i]<4.

A cost evaluation function is utilized to choose the optimal dictionary value, taking into account the row format of DOL table. In the example case, "aaaaa" will become the page dictionary entry. This process is repeated to generate all of the page dictionary entries.

Once the page dictionary entries are generated, they are reordered to compress the column as much as possible. For example, suppose two page dictionary entries have been generated, entry[0](aaaa) and entry[1](aaaaaaaaaa). Because of the byte order property of the colptr[ ], the entry[1] will be generated after entry[0]. However, if a column col (aaaaaaaaaaaa) is the input of the compression function, then it is preferred to compress it as much as possible, which would result from use of entry[1]. Accordingly, the reordering places entry[1] ahead of entry[0] in order to allow for more space savings.

Based on these entries, the row in the page is compressed where the redundant portion of the row has only one copy in the page (becomes the page dictionary entry), and its old position will be substituted by a symbol with much smaller size. One bit/column in the page dictionary chart suitably indicates whether the corresponding column has the page dictionary entry. If the specified column does have the page dictionary information, the first byte of the specified column is the index of the page dictionary row. If the row length after page-dictionary-compression exceeds the original row length, the original row is saved instead of the page-compressed one.

Figure 9:
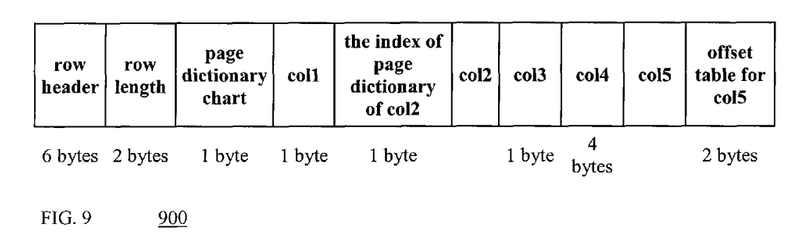
FIG. 9 depicts a row format using the page dictionary results based on example table data after the page dictionary compression in accordance with an embodiment of the present invention.

By way of example, using the same example table data as in FIG. 3, after the page dictionary compression, suppose the col2(char(50)) has the page dictionary information, so that the row format using the page dictionary results in the format 900 as shown in FIG. 9. As can be recognized, the row format includes a row header, followed by a row length, followed by a page dictionary chart, followed by fixed length columns, then variable length columns, and ending with an offset table. The first byte in col2 suitably indicates the page dictionary index with one bit in the status of the row header used to indicate whether the row has page dictionary information. Using one bit in the page dictionary chart can indicate whether the corresponding column has the page dictionary information. If the row doesn't have page dictionary information, the row has the ordinary row format (FIG. 4).

As described, this extraction process based on single columns has few steps to reduce the overhead caused by the page dictionary compression of the row and to reduce the CPU cost of the creation of the page dictionary.

In accordance with the present invention, compression on a page boundary is improved by extracting multiple column duplicates as well. As described above, if the column's length is short (i.e., does not exceed a predetermined threshold), there will not be any page dictionary entry generated from it. But in actual practice, there are often many duplicates in the page from such a short column. By way of example the following provides a table from the TPCC (Transaction Processing Performance Council C) benchmark.

```
create table order_line (
    ol_o_id       int,
    ol_d_id       tinyint,
    ol_w_id       smallint,
    ol_number     tinyint,
    ol_i_id       int,
    ol_supply_w_id smallint,
    ol_delivery_d datetime,
    ol_quantity   smallint,
    ol_amount     float,
    ol_dist_info  char(24)
) lock datapages
go
```

Figure 10:
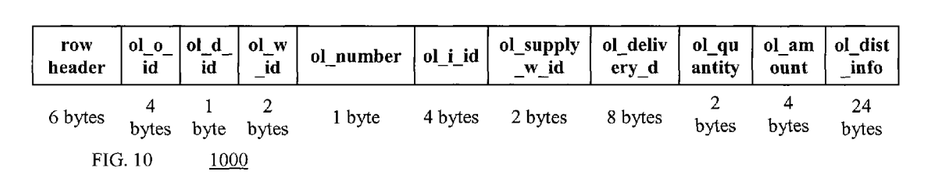
FIG. 10 depicts a standard row format for a sample table.
Figure 11:
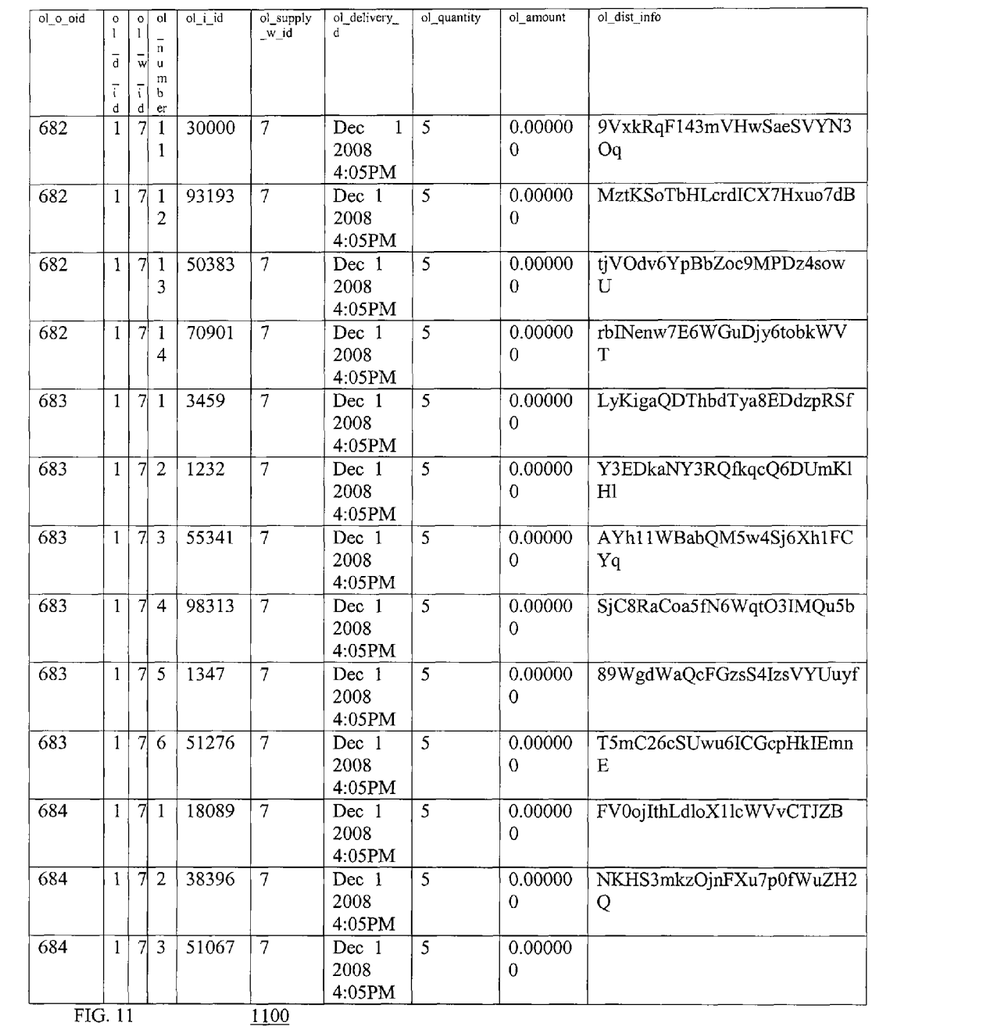
FIG. 11 depicts sample data for the sample table of FIG. 10.

FIG. 10 illustrates a standard row format 1000 for the table. FIG. 11 illustrates sample data 1100 for this table. As shown, in this example, there are many duplicates in the columns ol_d_id, ol_w_id, ol_supply_w_id, and ol_quantity. These columns have the same properties: their length is short and they are fixed length columns. So, in the process of the single column page dictionary generation, there will not be any entries from these columns, because they are less than the predetermined threshold for single page column extraction, e.g., 4 bytes. But, as can be seen from the example data, the information in these columns is redundant. So, another page compression method is introduced in an embodiment of the present invention to compress the page further.

The multiple column compression is performed in conjunction with the single column compression and simply checks for duplicates in the same column in the page. If one particular column has a large numbers of duplicates, the value of the duplicate will become the entry of a page index. For example, if it is found that column 1 has 40% duplicates, and column 2 has 50% duplicates, then there are about 20% cross-column duplicates (0.4×0.5=20% duplicates).

Figure 12:
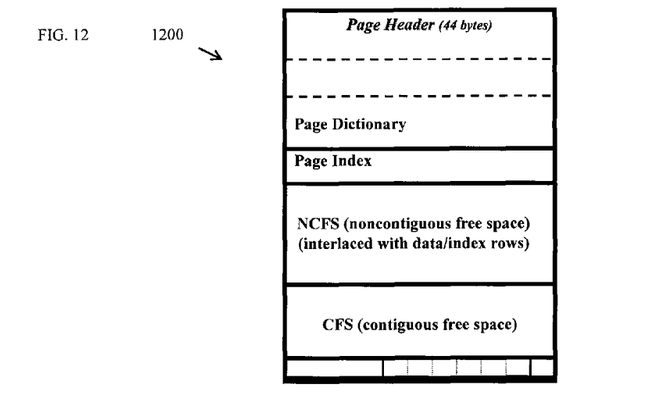
FIG. 12 depicts a page representation resulting when using both page dictionary compression and page index compression in accordance with an embodiment of the present invention.

By way of example, based on the sample table in FIG. 11, the values are the same across the rows in each of columns ol_d_id, ol_w_id, ol_supply_w_id and ol_quantity. The lengths of these columns are all below the defined threshold. Under the approach of the present invention, these values are extracted out to format the page index row. The page index is formed as one row with all the page index entries and preferably is placed behind the page dictionary row. FIG. 12 shows the page layout 1200 by using both page dictionary compression and page index compression.

Figure 13:
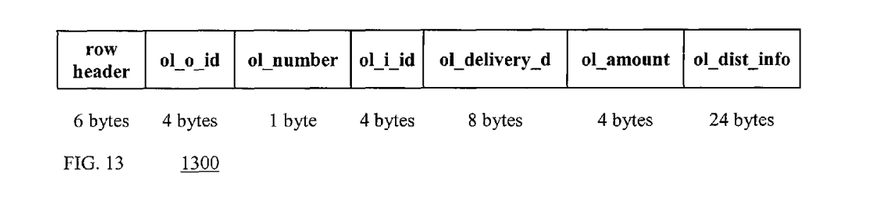
FIG. 13 depicts a row format for the sample data of FIG. 11 for a row with page index compression in accordance with an embodiment of the present invention.

When considering a page for compression, if one row's corresponding columns have all the same values as the page index row, one bit in the row status is used to indicate that this row can be page-index compressed, and the corresponding columns will not occupy any storage. For example, referring again to the sample table 1100, if the values of the four columns ol_d_id, ol_w_id, ol_supply_w_id and ol_quantity in one specified row are all the same with the page index row, one status bit is set in the row header to indicate that this row can be page-index compressed, and none of the contents of the four columns are stored in this row. For such a row, the row format would be changed to the row format 1300 shown in FIG. 13. As can be seen from comparing the row formats in FIG. 10 and FIG. 13, use of the page index row can provide an advantageous compression in the row format. Also, with the generation of the page index row occurring in the generation of page dictionary, there is no introduction of any new contention or any overhead, making it efficient to implement.

Figure 14:
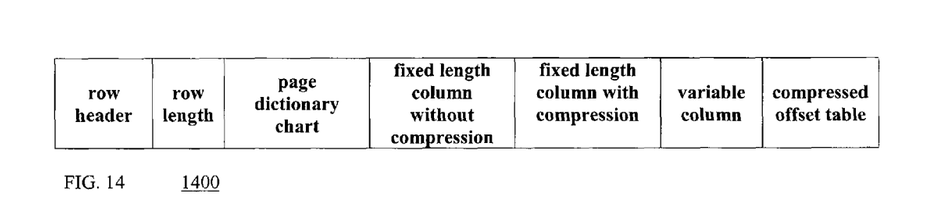
FIG. 14 depicts a row format when applying compression techniques on both a page and row boundary in accordance with an embodiment of the present invention.

While the embodiments describe compression on a row basis and a page basis separately, combining the techniques on a given page can achieve a high compression rate. FIG. 14 illustrates a resultant row format 1400 when applying both techniques in accordance with an embodiment of the invention. When to apply both techniques is dependent upon the needs of a particular system and indicated upon table creation, as is well appreciated by those skilled in the art. It can be recognized that when most operations on a table are SELECT operations, the combined, comprehensive compression realizes even better gain in space savings along with performance by reducing I/O and by reducing the metadata resources used to manage the data. In addition, the compression techniques of the present invention, whether used separately or together, can improve distributed database (or clusters) performance by reducing network data traffic. Also, memory utilization is improved by a reduced data footprint along with a reduction in the amount of data to log.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for reducing data storage requirements in a database system, comprising:

identifying, by a computing device, a data candidate of column data specified to be of a fixed length data type property for compression in a row of data having an uncompressed row format of column positioning based on:

a predetermined threshold configured to identify compressible column data of fixed length data types according to data type properties; and
a boundary of compression;
providing, by the computing device, an offset bitmap for the identified data candidate within the row, according to the boundary of compression, wherein the offset bitmap indicates lengths of compressed columns of the row following compression and variable length columns of the row; and
storing, by a computing device, the row containing the offset bitmap for the identified data candidate and the identified data candidate as compressed data with a compressed row format of column positioning within a database system, wherein the compressed row format of the row is repositioned from the uncompressed row format based on the identified data candidate.

2. The method of claim 1, wherein the data candidate identified for compression comprise fixed length columns having lengths that do not fall below the predetermined threshold in a row of data for compression based on a row boundary.

3. The method of claim 2, wherein the offset bitmap includes at least one bit indicating a length of the identified data candidate following compression.

4. The method of claim 1, wherein the data candidate identified for compression comprise redundant byte string data in a page of data for compression based on a page boundary.

5. The method of claim 4, wherein the redundant byte string data comprises matching data across columns having lengths that do not exceed the predetermined threshold.

6. The method of claim 5, wherein the at least one bit includes at least one bit in a row status to indicate compression of the identified data candidate.

7. The method of claim 4, further comprising extracting the redundant byte string data into a page index.

8. The method of claim 7, wherein the page index supplements a page dictionary for the page of data.

9. The method of claim 1, wherein the boundary of compression comprises a row boundary and a page boundary.

10. The method of claim 1, wherein the predetermined threshold comprises a column length.

11. The method of claim 1, wherein the predetermined threshold sets opposing limits depending upon the boundary of compression.

12. The method of claim 1, wherein the at least one bit provided for the identified data candidate indicates length of the identified data candidate after compression.

13. The method of claim 1 further comprising:
receiving, from a requesting module, a request to access the at least one row;
decompressing the at least one row based on the request; and
transferring, to the requesting module, the decompressed at least one row based on the request, wherein the at least one row remains in a decompressed state.

14. The method of claim 1, wherein the offset bitmap includes additional bits indicating lengths of variable length columns of the at least one row following compression.

15. A system configured to reduce data storage requirements in a database system, comprising:
one or more processors; and
a data management module configured to:
identify, using the one or more processors, a data candidate of column data specified to be of a fixed length data type property for compression in a row of data having an uncompressed row format of column positioning based on:
a predetermined threshold configured to identify compressible column data of fixed length data types according to data type properties; and
a boundary of compression;
provide, using the one or more processors, an offset bitmap for the identified data candidate within the row, according to the boundary of compression, wherein the offset bitmap indicates lengths of compressed columns of the row following compression and variable length columns of the row; and
store, using the one or more processors, the row containing the offset bitmap for the identified data candidate and the identified data candidate as compressed data with a compressed row format of column positioning within a database system, wherein the compressed row format of the row is repositioned from the uncompressed row format based on the identified data candidate.

16. The system of claim 15, wherein the data candidate identified for compression comprise fixed length columns having lengths that do not fall below the predetermined threshold in a row of data for compression based on a row boundary.

17. The system of claim 16, wherein the offset bitmap includes at least one bit indicating a length of the identified data candidate following compression.

18. The system of claim 15, wherein the data candidate identified for compression comprise redundant byte string data in a page of data for compression based on a page boundary.

19. The system of claim 18, wherein the redundant byte string data comprises matching data across columns having lengths that do not exceed the predetermined threshold.

20. The system of claim 19, wherein the at least one bit includes at least one bit in a row status to indicate compression of the identified data candidate.

21. The system of claim 15, wherein the predetermined threshold comprises a column length.

22. The system of claim 15, wherein the predetermined threshold sets opposing limits depending upon the boundary of compression.

23. A computer-readable storage device having instructions stored thereon that when executed by a processor, causes the processor to perform operations comprising:
identifying a data candidate of column data specified to be of a fixed length data type property for compression in a row of data having an uncompressed row format of column positioning based on:
a predetermined threshold configured to identify compressible column data of fixed length data types according to data type properties, and a boundary of compression;
providing an offset bitmap for the identified data candidate within the row, according to the boundary of compression, wherein the offset bitmap indicates lengths of compressed columns of the row following compression and variable length columns of the row; and
storing the row containing the offset bitmap for the identified data candidate and the identified data candidate as compressed data with a compressed row format of column positioning within a database system, wherein the compressed row format of the row is repositioned from the uncompressed row format based on the identified data candidate.

24. The storage device of claim 23, wherein the data candidate identified for compression comprise fixed length columns having lengths that do not fall below the predetermined threshold in a row of data for compression based on a row boundary.

25. The storage device of claim 23, wherein the offset bitmap includes at least one bit indicating a length of the identified data candidate following compression.

26. The storage device of claim 23, wherein the redundant byte string data comprises matching data across columns having lengths that do not exceed the predetermined threshold.

27. The storage device of claim 26, further comprising extracting the redundant byte string data into a page index.

28. The storage device of claim 27, wherein the page index supplements a page dictionary for the page of data.

29. The storage device of claim 23, wherein the at least one bit includes at least one bit in a row status to indicate compression of the identified data candidate.

30. The storage device of claim 23, wherein the boundary of compression comprises a row boundary and a page boundary.

31. The storage device of claim 23, wherein the predetermined threshold comprises a column length.

32. The storage device of claim 23, wherein the predetermined threshold sets opposing limits depending upon the boundary of compression.

\* \* \* \* \*